(12) United States Patent
Maliteare

(10) Patent No.: US 6,776,356 B2
(45) Date of Patent: Aug. 17, 2004

(54) HYDRAULIC ACTUATOR FOR SUPPORTING A BOOM

(75) Inventor: Jason Todd Maliteare, Carseland (CA)

(73) Assignee: Spray Air Technologies Ltd., Carseland (CA)

( * ) Notice: Subject to any disclaimer, the term of this patent is extended or adjusted under 35 U.S.C. 154(b) by 43 days.

(21) Appl. No.: 10/234,373

(22) Filed: Sep. 5, 2002

(65) Prior Publication Data

US 2003/0052188 A1 Mar. 20, 2003

Related U.S. Application Data

(60) Provisional application No. 60/318,316, filed on Sep. 12, 2001.

(51) Int. Cl.[7] .................................................. B05B 1/20
(52) U.S. Cl. .......................... 239/163; 92/85 B; 91/405
(58) Field of Search .......................... 92/85 B; 91/405; 239/163

(56) References Cited

U.S. PATENT DOCUMENTS

| | | | | |
|---|---|---|---|---|
| 3,831,500 A | * | 8/1974 | Kitamura et al. ............... | 92/68 |
| 4,043,254 A | * | 8/1977 | Jaeger .......................... | 92/85 B |
| 4,700,611 A | * | 10/1987 | Kaneko ........................ | 91/405 |
| 5,309,817 A | * | 5/1994 | Sims ........................... | 92/85 A |
| 6,053,419 A | * | 4/2000 | Krohn et al. .................. | 239/1 |

* cited by examiner

Primary Examiner—Hoang Nguyen
(74) Attorney, Agent, or Firm—Ryan W. Dupuis; Adrian D. Battison; Michael R. Williams

(57) ABSTRACT

A hydraulic actuator is provided for controlling relative movement between first and second structures between which the actuator is mounted, for example between a boom and the base frame of an agricultural sprayer, while providing some resilience in the form of suspension. The actuator comprises a piston cylinder having a floating cushion piston supported within the cylinder end to support the piston within the cylinder in a retracted position at a prescribed spacing from the cylinder end. The piston can thus be deflected from the retracted position in either direction using a pressure relief mechanism so as to provide some flexibility to the actuator to accommodate the varying forces between the pair of relatively movable structures between which the actuator is mounted. The cushion piston requires no additional electrical switches or controllers and can be part of the hydraulic circuitry of the actuator so as to provide a simple, low cost actuator with integral suspension.

20 Claims, 5 Drawing Sheets

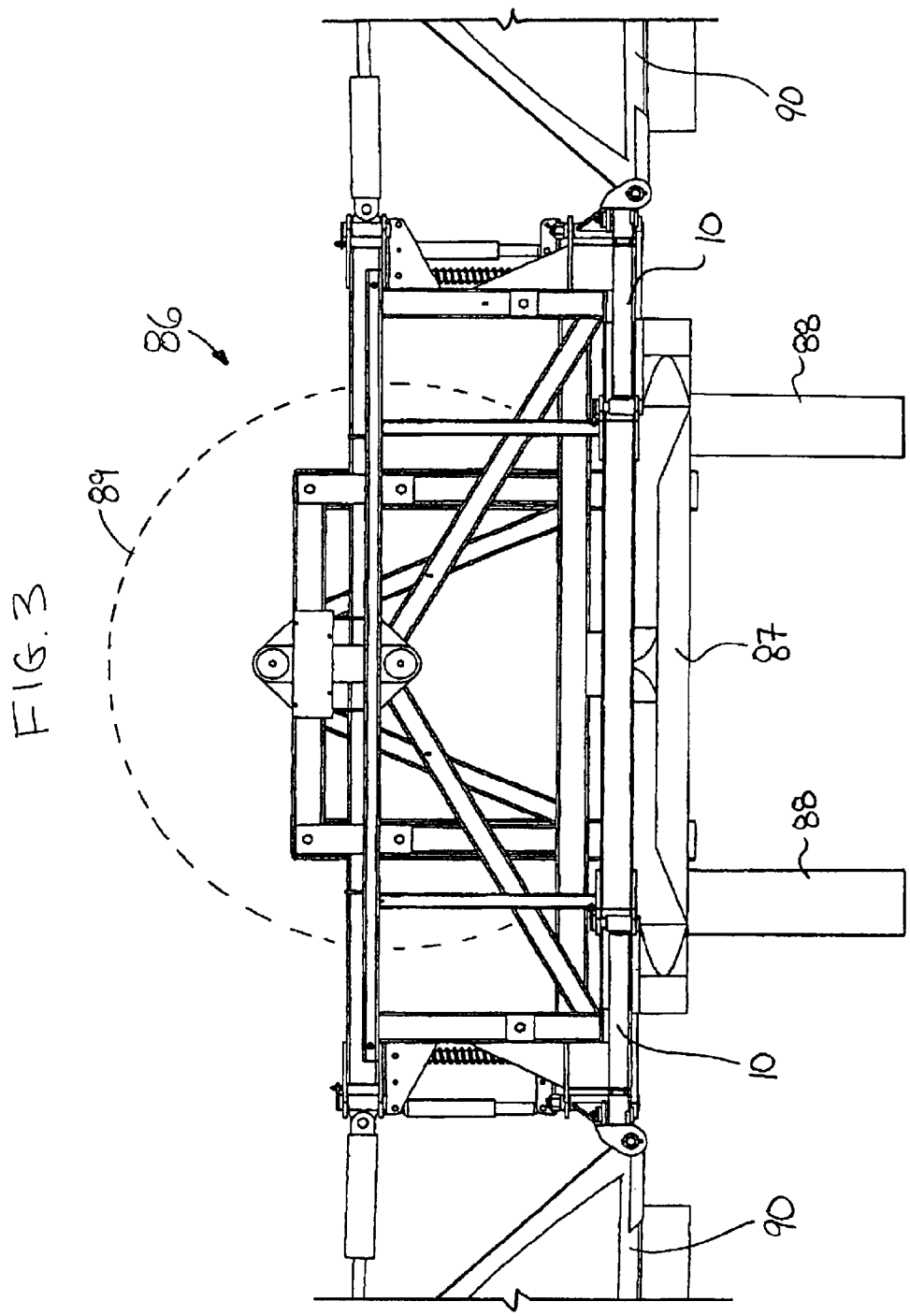

HYDRAULIC ACTUATOR FOR SUPPORTING A BOOM

This application claims the benefit of Provisional application No. 60/318,316 filed Sep. 12, 2001.

FIELD OF THE INVENTION

The present invention relates to a hydraulic actuator for controlling relative movement between first and second structures between which the actuator is mounted and more particularly to a hydraulic actuator having some having integral suspension.

BACKGROUND

Elongate structures, for example booms which are commonly used in various applications, are typically subjected to large bending forces, requiring some flexibility in order to prevent failure of the structure. In the agricultural industry for instance, booms are used for various application including spraying crops and the like. When displacing a boom of this type across a field, the boom may be subjected to varying bending forces due to uneven terrain, cornering and acceleration of the vehicle supporting the boom. Suspension of the boom thus must accommodate these varying bending forces to prevent failure of the boom structure.

Often elongate structures, including booms and the like, however must be collapsible for transport due to the irregular shape of the structures. Collapsing such a structure involves pivotally mounting the structure on a base frame and providing an actuator for displacing the structure between deployed and undeployed positions. Common actuators, such as hydraulic actuators, however are very rigid in both fully extended and retracted positions of the actuator and thus additional suspension is required to accommodate the flexibility needed of the structure.

In place of additional suspension when using a hydraulic actuator, the use of limit switches are known to prevent the actuator from being fully extended or retracted in normal operation such that some flexibility of the actuator is permitted when an accumulator or pressure relief is provided. The use of limit switches however results in a costly and complex design which is far less reliable than the hydraulic actuator itself.

SUMMARY

According to one aspect of the present invention there is provided a hydraulic actuator for controlling relative movement between first and second structures between which the actuator is mounted, the actuator comprising:

- a cylinder having a mounting end for coupling to one of the structures and an open end opposite the mounting end;
- a cushion piston slidably mounted within the cylinder;
- a stop member arranged to restrict displacement of the cushion piston away from the mounting end of the cylinder beyond a prescribed spacing from the mounting end of the cylinder in a static position of the cushion piston;
- a biasing mechanism urging the cushion piston away from the mounting end of the cylinder towards the static position adjacent the stop member, the cushion piston being movable against the biasing mechanism;
- a rod slidably mounted through the open end of the cylinder with the open end of the cylinder being sealed with respect to the rod, the rod having a piston end slidably mounted in sealing engagement within the cylinder between a retracted position adjacent the cushion piston and an extended position adjacent the open end of the cylinder and having a mounting end for coupling to the other structure; and
- hydraulic fluid supply lines coupled to both a retraction port adjacent the open end of cylinder in communication with a first side of the piston end of the rod to retract the rod into the retracted position and an extension port adjacent the mounting end of the cylinder in communication with a second side of the piston end of the rod to extend the rod into the extended position;
- the rod being movable with the cushion piston towards the mounting end of the cylinder beyond the retracted position when subjected to a force which exceeds a prescribed holding force of the biasing mechanism.

The cushion piston provides some flexibility to the actuator to accommodate the varying forces between a pair of relatively movable structures between which the actuator is mounted. The cushion piston requires no additional electrical switches or controllers and can be part of the hydraulic circuitry of the actuator so as to provide a simple, low cost actuator with integral suspension which is effective and reliable unlike any prior known device.

In a preferred embodiment, the cushion piston is sealed with respect to the cylinder and the biasing mechanism comprises a cushion chamber under hydraulic pressure within the cylinder between the cushion piston and the mounting end of the cylinder.

Pressure of hydraulic fluid within the cushion chamber and at the retraction port are preferably substantially equal in the retracted position. Accordingly, a cross sectional area of the cushion piston in communication with the cushion chamber is preferably greater than a cross sectional area of the first side of the piston end of the rod in communication with the retraction port.

There may be provided a pressure relief mechanism in communication with the cushion chamber and the retraction port so as to permit the rod to be deflected from the retracted position in either direction. In one embodiment, the pressure relief mechanism includes a hydraulic fluid accumulator in communication with each of the cushion chamber and the retraction port, permitting hydraulic fluid to be received therein when a prescribed holding force of the accumulator is exceeded.

When the hydraulic fluid lines are coupled in communication with the cushion chamber, a hydraulic switch is preferably arranged to selectively couple the hydraulic fluid lines to an outlet and a return reservoir of a hydraulic fluid pump.

The cushion chamber and the retraction port may be arranged to communicate with one another at a junction between the hydraulic switch and the cylinder. A flow restrictor is preferably coupled in series with the hydraulic fluid lines between the junction and the retraction port to ensure the cushion chamber is pressurised first.

There may be provided a check valve coupled in communication with a respective one of the hydraulic fluid supply lines of each of the retraction and extension ports, the check valve of each port being operable when the respective hydraulic fluid supply line of the other port is pressurised.

The piston end of the rod is preferably engaged upon the cushion piston in the retracted position of the rod. When the stop member is mounted between the piston end of the rod and the cushion piston, the stop member preferably spans only partway into the cylinder to permit communication of the piston end of the rod and the cushion piston across the stop member.

There may be provided a projection engaged between the cushion piston and the piston end of the rod to displace the cushion piston from the stop member before the piston end of the rod engages the stop member when the rod is deflected from the retracted position towards the mounting end of the cylinder.

The stop member is preferably fixed in relation to the cylinder.

The hydraulic actuator may be provided in combination with a boom structure pivotally supported on a base frame structure for movement relative to the base frame structure, the mounting end of the cylinder and the mounting end of the rod each being coupled to a respective one of the structures. Preferably the mounting end of the cylinder is mounted on the base frame structure and the mounting end of the rod is mounted on the boom structure.

The hydraulic actuator may also be provided in combination with an agricultural sprayer comprising:

a base frame structure having a tank supported thereon for rolling movement along the ground; and a boom structure pivotally supported on the base frame structure for pivotal movement relative to the base frame structure, the boom structure having spraying lines and nozzles supported thereon in communication with the tank on the base frame;

the mounting end of the cylinder and the mounting end of the rod each being coupled to a respective one of the structures.

The hydraulic actuator in this instance preferably controls pivotal movement of the boom structure relative to the base frame structure about an upright axis.

The hydraulic actuator may control pivotal movement of the boom structure relative to the base frame structure between a folded position in which the boom structure extends generally in a direction of travel of the sprayer and a field position in which the boom structure lies transversely to the direction of travel. The rod is preferably oriented so as to be in the retracted position of the rod when the boom structure is in the field position.

BRIEF DESCRIPTION OF THE DRAWINGS

In the accompanying drawings, which illustrate an exemplary embodiment of the present invention:

FIG. 3 is a rear elevational view of an agricultural sprayer upon which the actuator of FIG. 1 is mounted.

DETAILED DESCRIPTION

Figure 1:
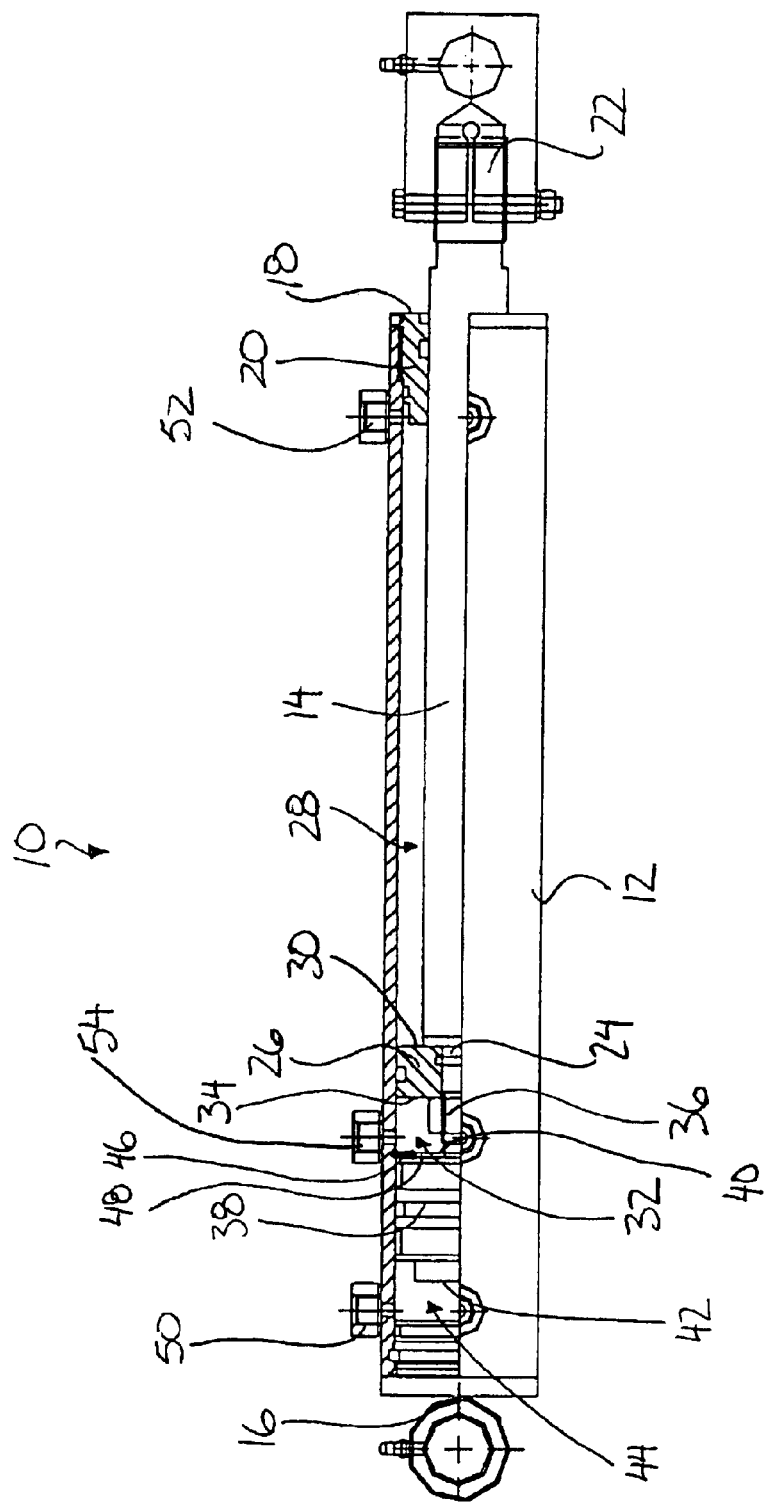
FIG. 1 is a partly sectional view of the hydraulic actuator.

Referring to the accompanying drawings, there is illustrated a hydraulic actuator generally indicated by reference numeral 10. The actuator 10 is intended for use in controlling relative movement between a pair of structures when some limited flexibility is required between the two structures. The actuator 10 is particularly useful for controlling the position of a boom for example as in an agricultural boom of a sprayer shown in FIGS. 3 through 5.

Referring initially to FIGS. 1 and 2A through 2C, the actuator 10 and the hydraulic circuitry controlling it are shown in greater detail. The actuator 10 generally comprises a cylinder 12 which slidably mounts a rod 14 therein.

The cylinder 12 includes a pivot mount on a mounting end 16 for pivotally mounting on a supporting structure. The cylinder 12 further includes an open end 18 opposite the mounting end arranged to slidably mount the rod 14 therethrough. A plug 20 is provided in the open end of the cylinder having an aperture for receiving the rod 14 therethrough. The plug 20 is suitably arranged to seal between the rod 14 and the surrounding wall of the cylinder 12 while permitting the rod 14 to remain slidable relative to the cylinder.

The rod 14 includes a mounting end 22 which projects from the cylinder 12 which similarly includes a pivot mount for pivotally mounting to a supporting structure. Opposite the mounting end 22, the rod 14 includes a piston end 24 having an annular member 26 mounted thereon for sliding movement within the cylinder 12. The annular member 26 at the piston end of the rod is arranged to be sealed with respect to the surrounding walls of the cylinder 12 so as to divide the cylinder into a retraction chamber 28 in communication with a first side 30 of the annular member and an extension chamber 32 in communication with a second side 34 of the annular member 26. A projection extends longitudinally outwardly from the second side 34 of the annular member of the rod in the form of a bolt 36 which is provided for mounting the annular member 26 on the piston end of the rod. The bolt 36 thus acts as a spacer between the piston end of the rod and a cushion piston 38.

The cushion piston 38 is provided in the form of a round plug which is slidably mounted within the cylinder in sealing engagement with the walls of the cylinder. The cushion piston 38 is mounted within the cylinder between the piston end of the rod 14 and the mounting end 16 of the cylinder. The cushion piston 38 includes a first end face 40 in communication with the extension chamber and a second end face 42 in communication with a cushion chamber 44 defined between the cushion piston 38 and the mounting end of the cylinder 12.

Pressure within the cushion chamber 44 is arranged to bias the cushion piston 38 away from the mounting end of the cylinder 12. A stop member 46 is mounted within the cylinder walls to restrict displacement of the cushion piston 38 away from the mounting end of the cylinder beyond a prescribed spacing from the mounting end of the cylinder in a static position of the cushion piston in which the piston 38 engages the stop member 46.

The stop member 46 generally comprises an annular ring partially embedded into an inner surface of the walls of the cylinder 12 at a fixed spacing from the mounting end of the cylinder for engaging the first end face 40 of the cushion piston 38. The stop member 46 only spans partway into and across the cylinder to define an opening 48 therein which is suitably sized to receive the bolt 36 at the end of the rod therethrough when the bolt 36 extends across the stop member, engaged between the piston end of the rod and the cushion piston. The first end face 40 of the cushion piston 38 is a generally flat face lying perpendicular to the longitudinal direction of the cylinder for engaging the bolt 36 projecting from the piston end of the rod 14 when the rod is retracted into the cylinder.

Hydraulic fluid is introduced into the cylinder 12 through a set of ports extending through the walls of the cylinder 12. These ports include a cushion port 50, a retraction port 52 and an extension port 54.

The cushion port 50 is located adjacent the mounting end 16 of the cylinder and is arranged to communicate with the cushion chamber 44 so as to control the pressure of hydraulic fluid within the cushion chamber.

The retraction port 52 is located adjacent the open end 18 of the cylinder in communication with the retraction chamber 28 to control the pressure of hydraulic fluid acting on the first side 30 of the annular member at the end of the rod 14 for retracting the rod within the cylinder.

The extension port 54 is located intermediate the cushion port 50 and the retraction port 52 nearer to the mounting end 16 of the cylinder. The extension port 54 is located adjacent the stop member 46 with the stop member being positioned immediately adjacent the extension port on a side which is closest to the mounting end 16 of the cylinder. The extension port 54 is thus suitably arranged to communicate with the extension chamber 32 of the cylinder for controlling the pressure of hydraulic fluid acting on the second side 34 of the annular member at the piston end of the rod so as to extend the rod from the cylinder.

The rod 14 is movable from an extended position to a retracted position. In the extended position, the piston end of the rod is located adjacent the open end of the cylinder with pressure in the extension chamber 32 being greater than pressure within the retraction chamber 28.

In the retracted position the annular member 26 at the piston end of the rod 14 is located adjacent the cushion piston 38 at the mounting end of the cylinder. In the retracted position pressure in the retraction chamber 28 is greater than pressure within the extension chamber 32 while pressure in the cushion chamber 44 and the retraction chamber 28 are substantially equal.

The cross sectional area of the cushion piston 38 at the second end face 42 in communication with the cushion chamber 44 is greater than the cross sectional area of the first side 30 of the annular member at the piston end of the rod 14 in communication with the retraction chamber 28 such that the force acting on the cushion piston 38 is greater in the direction which biases the cushion piston 38 against the stop member 46 in the static position thereof than the force of the piston end 24 of the rod acting on the first end face 40 of the cushion piston. The bolt 36 at the piston end of the rod thus holds the annular member 26 at a fixed spacing from the cushion piston 38 in the retracted position of the actuator.

Figure 2B:
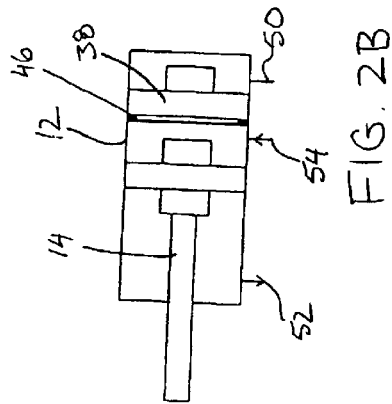
FIGS. 2B and 2C are schematics of the actuator as shown in FIG. 2A with the actuator in respective first and second deflected positions from the static retracted position.
Figure 2C:
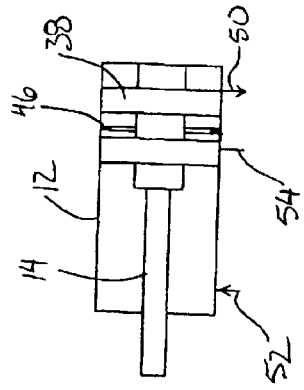

When the rod 14 is in the retracted position and the cushion piston 38 is in the static position thereof, excess force acting on the rod 14 in either direction allows some limited movement into one of the first and second deflected positions shown in FIGS. 2C and 2B respectively. FIG. 2C illustrates the first deflected position in which the rod is deflected towards the mounting end 16 of the cylinder beyond the retracted position shown in FIG. 2A. This occurs when force acting on the rod 14 exceeds a prescribed holding force of the cushion chamber 44 in the static position thereof. The prescribed holding force is determined by the pressure relief setting for the cushion chamber 44 to be described later herein, as well as the difference in the cross sectional area between the second end face 42 of the cushion piston and the first side 30 of the piston end of the rod.

The second deflected position is shown in FIG. 2B in which the rod 14 is deflected from the retracted position towards the extended position. The rod is deflected into the second deflected position if force acting on the rod 14 in a direction to extend the rod is greater than a pressure relief setting of the retraction chamber 28 also to be described later herein.

Figure 2A:
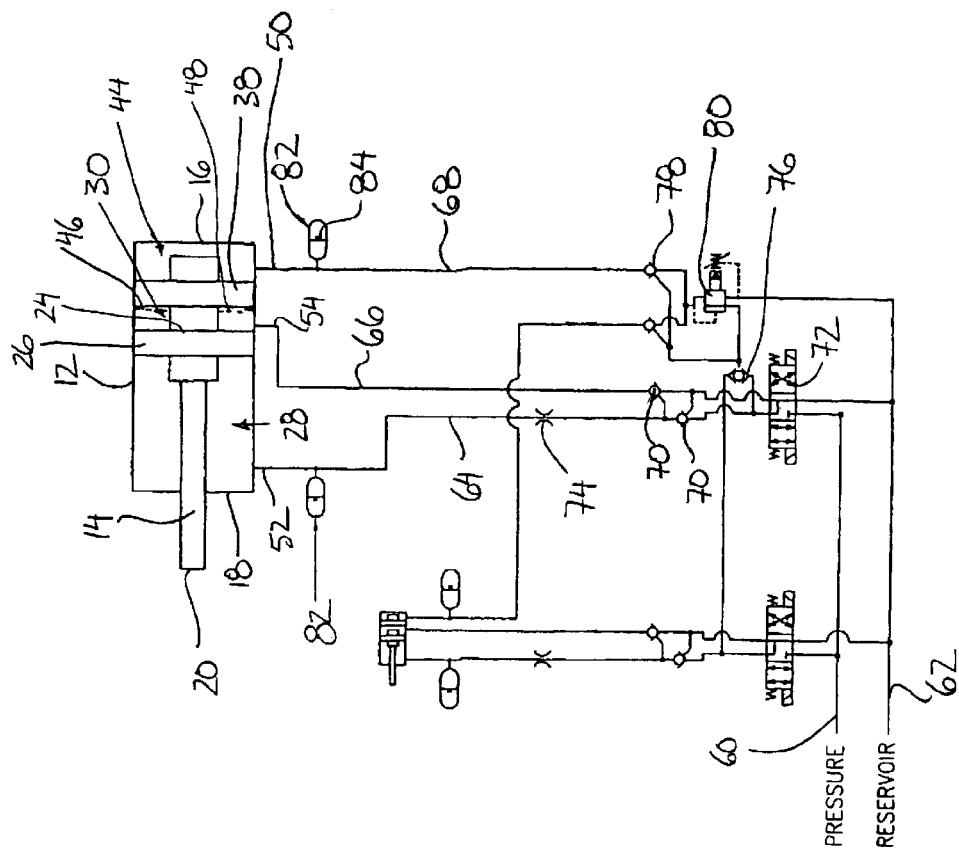
FIG. 2A is a schematic of the hydraulic circuitry coupled to the actuator of FIG. 1 with the actuator in a static retracted position.

The hydraulic circuitry operating the actuator 10 is shown in further detail in FIG. 2A in which two actuators 10 are shown coupled in parallel with a pressure supply line 60 in communication with the outlet of a hydraulic fluid pump and a reservoir return line 62 of the pump. The connection of the two actuators 10 to the lines 60 and 62 are similar and thus only one of the actuators will be described herein in detail.

The actuator 10 includes a retraction line 64 coupled to the retraction port 52, an extension line 66 coupled to the extension port 54 and a cushion line 68 coupled to the cushion port 50. The retraction line 64 and the extension line 66 each include a check valve 70 coupled in series therewith between the cylinder and a hydraulic switch in the form of a directional valve 72 selectively coupling the ports to the respective pressure supply and reservoir return lines. The cushion line 68 is coupled in communication with the retraction line 64 at a junction between the valve 72 and the cylinder so as to be pressurised when the retraction line is pressurised.

Displacing the directional valve 72 as illustrated to the right acts to retract the piston by coupling the retraction line 64 to the pressure supply line 60 and the extension line 66 to the reservoir return line 62. A pilot line on the check valve 70 of the extension line 66 is coupled to the retraction line 64 to hold the check valve 70 of the extension line 66 open to drain the extension chamber 32 as required when retracting the rod within the cylinder.

Once in the retracted position as illustrated in FIG. 2A, the directional valve 72 is returned to the neutral position in which the pressure supply line 60 is capped. The check valve 70 in the retraction line 64 hold the pressure in the retraction line so that pressure is maintained on the pilot line of the check valve 70 of the extension line 66 to maintain the extension line 66 draining to the reservoir return line 62 while also draining the pilot line for the check valve 70 of the retraction line 64 to maintain that check valve closed. As long as the check valve 70 of the retraction line 64 is closed pressure will be maintained in the retraction chamber and the pilot on the check valve of the extension line 66 holds that check valve open so that the extension line remains free to draw fluid from or dump fluid to the reservoir return line as needed for deflection of the actuator.

Deflection of the directional valve 72 to the left as illustrated in FIG. 2A causes the retraction line 64 to be coupled to the reservoir return line 62 and the extension line 66 to be coupled to the pressure supply line 60 to pressurize the extension chamber and drain the retraction chamber through the retraction line 64. This is permitted because the pilot line of the check valve 70 of the retraction line 64 is held open by pressure in the extension line 66 so that the retraction chamber is free to drain to the reservoir return line 62.

The cushion line 68 is coupled to the retraction line 64 after the directional valve 72 so as to be pressurized when the retraction line 64 is pressurized at substantially the same pressure in both. Pressure of hydraulic fluid distributed to the cushion chamber and the retraction chamber is thus substantially equal when in the retracted position. A flow restrictor 74 is located in the retraction line 64 between the junction with the cushion line 68 and the cylinder to optimise flow to the retraction chamber by permitting the cushion chamber to be filled first. In the equilibrium position, flow through the flow restrictor 74 will eventually equalize to a balance pressure within the retraction chamber and the cushion chamber.

The cushion line 68 includes a first check valve 76 at a point of coupling to the retraction line 64 and a second check valve 78 coupled in series after a pressure relief valve 80 in series with the cushion line 68 between the first and second check valves. A pilot line on the second check valve 78 is coupled to the cushion line 68 immediately after the first check valve 76 to maintain the second check valve 78 open when the directional valve 72 is deflected to the right for retraction of the rod within the cylinder. The cushion line 68 after the first check valve is thus arranged to drain beyond the second check valve 78 at the pressure relief valve 80 as required if excess pressure in the line occurs.

An accumulator 82 is coupled in communication to both the retraction line 64 and the cushion line 68 adjacent the respective ports coupling the lines to the cylinder to selectively relieve pressure temporarily within the respective lines as required. Each accumulator 82 is a chamber having a diaphragm 84 mounted therein for dividing the chamber into a first side in communication with the respective hydraulic line and a second side which is pressurized with gas.

Pressure of the gas within the accumulator 82 adjusts the prescribed holding force of the actuator to resist deflection into one of the first and second deflected positions and the volume of the accumulator adjusts the rate of increase in holding force per amount of deflection into the first and second deflected positions. In the respective deflected positions force acting on the rod 14 causes pressure within one of the hydraulic fluid lines to exceed a prescribed holding force of a respective accumulator 82 as determined by the gas pressure thereof so that the diaphragm 84 is deflected to compress the gas and receive hydraulic fluid from the hydraulic lines coupled thereto to relieve pressure in the hydraulic line temporarily. Firmness of the cylinder is controlled by the charge of pressure within the accumulator in conjunction with the setting of the pressure relief valve 80.

When mechanical forces cause the rod to retract beyond the retracted position, hydraulic fluid is displaced from the cushion chamber into the accumulator 82 coupled to the cushion line 68 so that the piston end of the rod 14 and the cushion piston 38 move together from the retracted position towards the mounting end 16 of the cylinder. If the cylinder is extended due to the mechanical forces, the hydraulic fluid is pushed out of the retraction chamber into the accumulator 82 coupled to the retraction line 64. The extension line 66 being coupled to the reservoir return line 62 allows fluid to be drawn into the extension chamber while the cushion piston 38 remains in the static position. In either case the pressure ramps in the respective accumulator 82 until the forces of the hydraulic fluid and the gas are balanced at which point the accumulator then returns the oil back to the cylinder to return the cylinder to the neutral retracted position of FIG. 2A.

Figure 4:
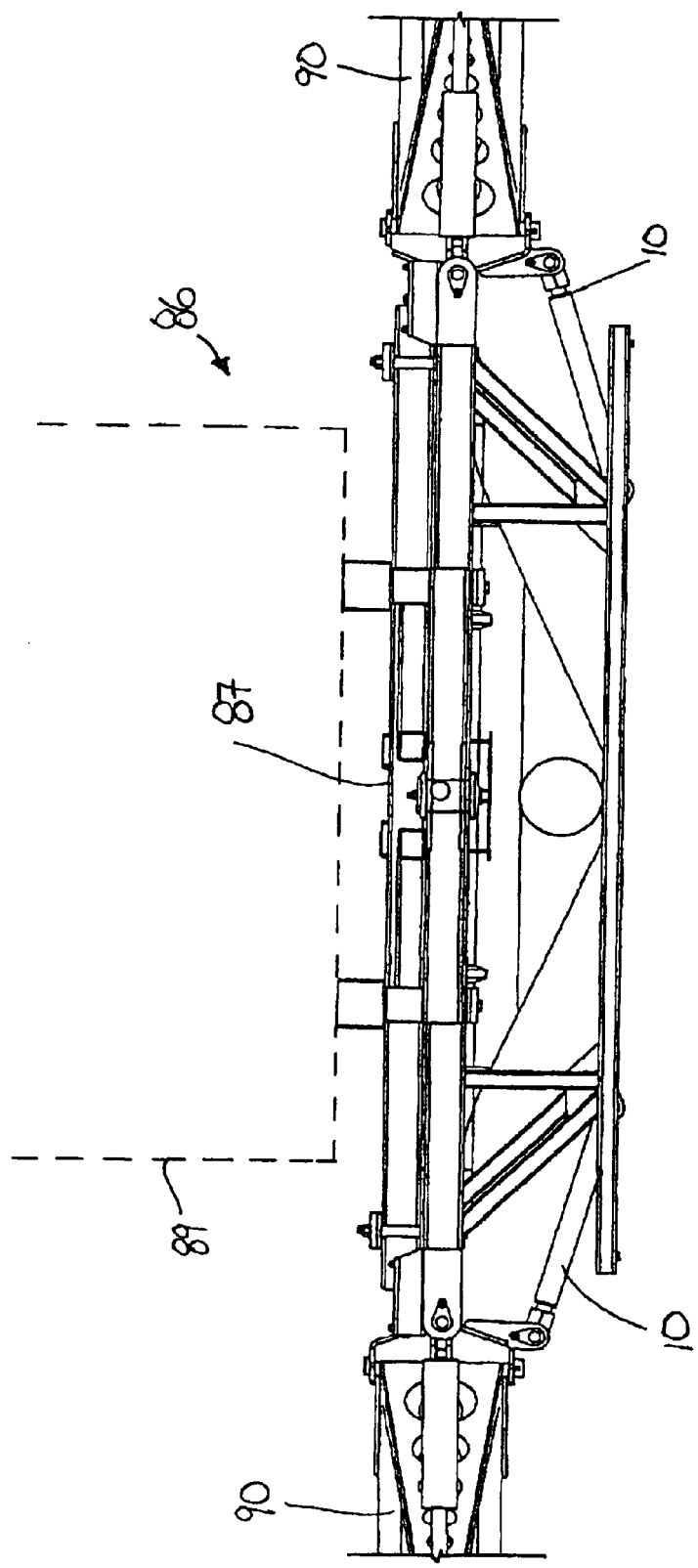
FIG. 4 is a top plan view of the sprayer according to FIG. 3.
Figure 5:
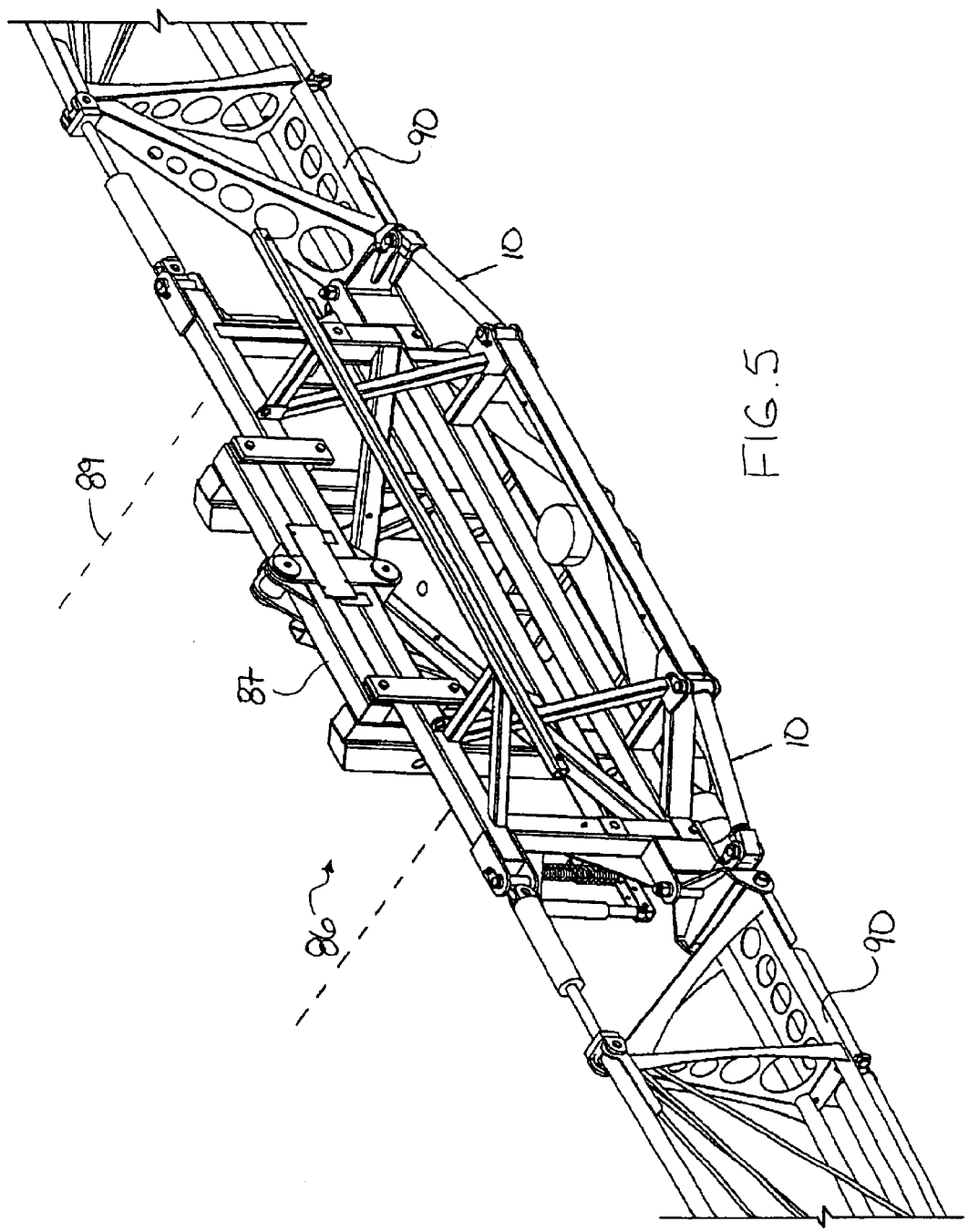
FIG. 5 is an isometric view of the sprayer according to FIG. 3.

As noted previously in one application of the hydraulic actuator 10, a pair of the actuators are mounted on an agricultural sprayer 86 as shown in FIGS. 3 through 5. The sprayer 86 includes a base frame 87 supported on wheels 88 for rolling movement across the ground. The base frame 87 may be either a pull-type frame for towing behind a tractor or a self-propelled frame having its own drive system. A tank 89 for containing spraying fluid is arranged to be supported on the base frame 87 for movement across the ground therewith.

A pair of booms 90 are provided which are pivotally mounted at respective inner ends on the base frame 87 about a generally upright axis so as to be pivotal between a field position in which the booms span laterally outwardly in opposite directions from the base frame, transversely to a direction of travel of the sprayer and a folded position in which the booms 90 are pivoted forwardly so as to be generally parallel to one another along opposing sides of the base frame 87, extending generally in the direction of travel of the sprayer.

An actuator 10 according to the present invention is coupled between each boom 90, at the mounting end of the rod, and the base frame 87, at the mounting end of the cylinder, for displacing the booms into the field position as the actuators are retracted and for displacing the booms into the folded position when the actuators are extended. When the booms are located in the field position the rod 14 of each actuator 10 is in the retracted position as illustrated in FIG. 2A in which the rod may be deflected in either direction into one of the deflected positions as shown in FIGS. 2B and 2C.

Due to the elongate structure of the booms 90, significant forward and rearward bending forces are present when the sprayer travels over the field and either accelerates, rocks forwardly and rearwardly over uneven terrain or turns corners. When turning a corner in the field for instance, the forward speed of the booms 90 may accelerate quickly from low speeds in the order of 3 miles per hour upwards to higher speeds in the order of 16 miles per hour. The use of the actuators 10 provides some flexibility to the boom structure by permitting the booms to be deflected slightly forwardly and rearwardly from the field position by deflecting the rod 14 of each actuator between the respective first and second deflected positions thereof.

While one embodiment of the present invention has been described in the foregoing, it is to be understood that other embodiments are possible within the scope of the invention. The invention is to be considered limited solely by the scope of the appended claims.

What is claimed is:

1. A hydraulic actuator for controlling relative movement between first and second structures between which the actuator is mounted, the actuator comprising:
   a cylinder having a mounting end for coupling to one of the structures and an open end opposite the mounting end;
   a cushion piston slidably mounted within the cylinder which is sealed with respect to the cylinder to define a cushion chamber between the cushion piston and the mounting end at the cylinder;
   a stop member arranged to restrict displacement of the cushion piston away from the mounting end of the cylinder beyond a prescribed spacing from the mounting end of the cylinder in a static position of the cushion piston;
   a rod slidably mounted through the open end of the cylinder with the open end of the cylinder being sealed with respect to the rod, the rod having a piston end slidably mounted in sealing engagement within the cylinder between a retracted position adjacent the cushion piston and an extended position adjacent the open end of the cylinder and having a mounting end for coupling to the other structure;
   the cylinder including:
      a retraction port adjacent the open end of cylinder in communication with a first side of the piston end of the rod to retract the rod into the retracted position when receiving fluid under pressure through the retraction port,
      an extension port adjacent the mounting end of the cylinder in communication with a second side of the piston end of the rod to extend the rod into the extended position when receiving fluid under pressure through the extension port, and a cushion port adjacent mounting end of the cylinder in communication with the cushion chamber for urging the cushion piston away from the mounting end of the cylinder towards the static position adjacent the stop member;

hydraulic fluid circuitry selectively coupling both the retraction port and the cushion port to common fluid under pressure in the retracted position; and a pressure relief mechanism coupled to the cushion chamber whereby the rod is movable with the cushion piston towards the mounting end of the cylinder beyond the retracted position when subjected to a force which exceeds a prescribed holding force of the pressure relief mechanism.

2. The hydraulic actuator according to claim 1 wherein a cross sectional area of the cushion piston in communication with the cushion chamber is greater than a cross sectional area of the first side of the piston end of the rod in communication with the retraction port.

3. The hydraulic actuator according to claim 1 wherein pressure of hydraulic fluid within the cushion chamber and at the retraction port are substantially equal in the retracted position.

4. The hydraulic actuator according to claim 3 wherein a cross sectional area of the cushion piston in communication with the cushion chamber is greater than a cross sectional area of the first side of the piston end of the rod in communication with the retraction port.

5. The hydraulic actuator according to claim 1 wherein there the pressure relief mechanism is in communication with both the cushion chamber and the retraction port so as to permit the rod to be deflected from the retracted position in either direction.

6. The hydraulic actuator according to claim 5 wherein the pressure relief mechanism includes a hydraulic fluid accumulator in communication with each of the cushion chamber and the retraction port permitting hydraulic fluid to be received therein when a prescribed holding force of the accumulator is exceeded.

7. The hydraulic actuator according to claim 1 wherein there is provided a hydraulic switch being arranged to selectively couple the hydraulic fluid circuitry to an outlet and a return reservoir of a hydraulic fluid pump.

8. The hydraulic actuator according to claim 7 wherein the cushion chamber and the retraction port are arranged to communicate with one another at a junction between the hydraulic switch and the cylinder.

9. The hydraulic actuator according to claim 8 wherein there is provided a flow restrictor coupled in series with the hydraulic fluid circuitry between the junction and the retraction port.

10. The hydraulic actuator according to claim 1 wherein there is provided a check valve coupled in communication with a respective hydraulic fluid supply line of the hydraulic fluid circuitry associated with each of the retraction and extension ports, the check valve of each port being operable when the respective hydraulic fluid supply line of the other port is pressurized.

11. The hydraulic actuator according to claim 1 wherein the piston end of the rod is engaged upon the cushion piston in the static position in the retracted position of the rod.

12. The hydraulic actuator according to claim 11 wherein the stop member is mounted between the piston end of the rod and the cushion piston, the stop member spanning only partway into the cylinder to permit communication of the piston end of the rod end the cushion piston across the stop member.

13. The hydraulic actuator according to claim 12 wherein there is provided a projection engaged between the cushion piston and the piston end of the rod to displace the cushion piston from the stop member before the piston end of the rod engages the stop member when the rod is deflected from the retracted position towards the mounting end of the cylinder.

14. The hydraulic actuator according to claim 1 wherein the stop member is fixed in relation to the cylinder.

15. The hydraulic actuator according to claim 1 in combination with a boom structure pivotally supported on a base frame structure for movement relative to the base frame structure, the mounting end of the cylinder and the mounting end of the rod each being coupled to a respective one of the structures.

16. The hydraulic actuator according to claim 15 wherein the mounting end of the cylinder is mounted on the base frame structure and the mounting end of the rod is mounted on the boom structure.

17. The hydraulic actuator according to claim 1 in combination with an agricultural sprayer comprising:

a base frame structure having a tank supported thereon for rolling movement along the ground; and a boom structure pivotally supported on the base frame structure for pivotal movement relative to the base frame structure, the boom structure having spraying lines and nozzles supported thereon in communication with the tank on the base frame;

the mounting end of the cylinder and the mounting end of the rod each being coupled to a respective one of the structures.

18. The hydraulic actuator according to claim 17 wherein the hydraulic actuator controls pivotal movement of the boom structure relative to the base frame structure about an upright axis.

19. The hydraulic actuator according to claim 17 wherein the hydraulic actuator controls pivotal movement of the boom structure relative to the base frame structure between a folded position in which the boom structure extends generally in a direction of travel of the sprayer and a field position in which the boom structure lies transversely to the direction of travel, the rod being in the retracted position in the field position.

20. A hydraulic actuator for controlling relative movement between first and second structures between which the actuator is mounted, the actuator comprising:

a cylinder having a mounting end for coupling to one of the structures and an open end opposite the mounting end;

a cushion piston slidably mounted within the cylinder which is sealed with respect to the cylinder to define a cushion chamber between the cushion piston and the mounting end of the cylinder;

a stop member arranged to restrict displacement of the cushion piston away from the mounting end of the cylinder beyond a prescribed spacing from the mounting end of the cylinder in a static position of the cushion piston;

a rod slidably mounted through the open end of the cylinder with the open end of the cylinder being sealed with respect to the rod, the rod having a piston end sildably mounted in sealing engagement within the cylinder between a retracted position adjacent the cushion piston and an extended position adjacent the open end of the cylinder and having a mounting end for coupling to the other structure;

the cylinder including:
- a retraction port adjacent the open end of cylinder in communication with a first side of the piston end of the rod to retract the rod into the retracted position when receiving fluid under pressure through the retraction port,
- an extension port adjacent the mounting end of the cylinder in communication with a second side of the piston end of the rod to extend the rod into the extended position when receiving fluid under pressure through the extension port, and
- a cushion port adjacent the mounting end of the cylinder in communication with the cushion chamber for urging the cushion piston away from the mounting end of the cylinder towards the static position adjacent the stop member;

hydraulic fluid circuitry selectively coupling both the retraction port and the cushion port to fluid under pressure in the retracted position; and a pressure relief mechanism coupled to the retraction port and coupled to the cushion chamber whereby the rod is movable with the cushion piston towards the mounting end of the cylinder beyond the retracted position when subjected to a force which exceeds a prescribed holding force of the pressure relief mechanism;

the pressure relief mechanism including a hydraulic fluid accumulator in communication with each of the cushion chamber and the retraction port permitting hydraulic fluid to be received therein when the prescribed holding force of the accumulator is exceeded.

* * * * *